Figure 1:
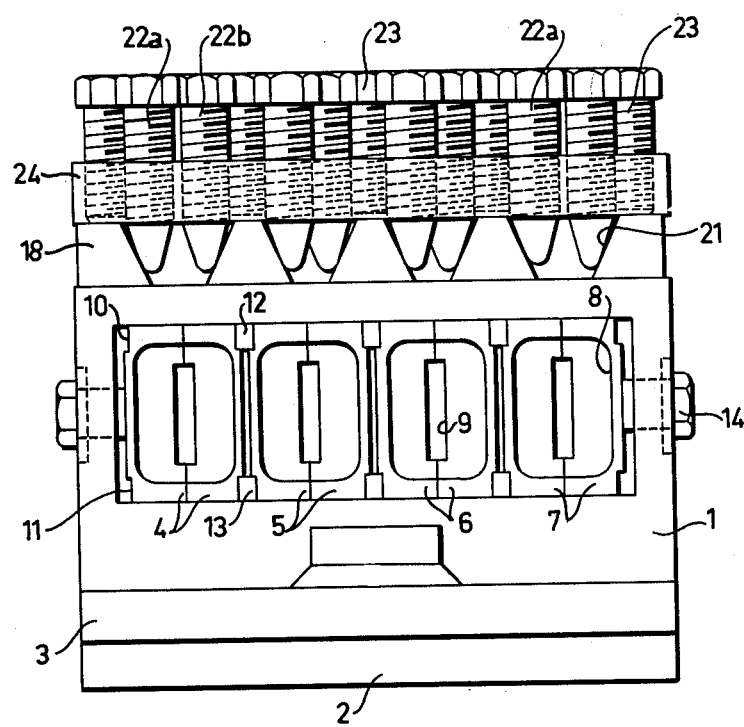

Nov. 17, 1964   O. AZZARRI   3,157,072
GUIDE-BOX FOR ROLLING-MILLS
Filed May 25, 1962   2 Sheets-Sheet 1

United States Patent Office 3,157,072
Patented Nov. 17, 1964

3,157,072
GUIDE-BOX FOR ROLLING-MILLS
Orlando Azzarri, Torshalla, Sweden, assignor to Nyby Bruks Aktiebolag, Nybybruk, Sweden, a company of Sweden
Filed May 25, 1962, Ser. No. 197,763
Claims priority, application Sweden May 31, 1961
6 Claims. (Cl. 80—51)

This invention relates to a roller guide for rolling mills. The roller guide is of the type that contains at least two steering rollers mounted on roller holders for the metal to be rolled and at least one auxiliary steering device to steer the metal to be rolled before it passes between the steering rollers.

Roller guides of this type have consisted of an auxiliary steering device as well as two steering rollers whose roller holders have been mounted one on each side of the auxiliary steering device. Such an arrangement calls for space at the sides which is considerably larger than the width of the material to be rolled. This large demand for space at the sides is a disadvantage, for example, when one wishes to make simultaneous use of two roller grooves which lie as close as possible to each other, or when one wishes to use the extreme groove on a roller. Bearings or other parts of the rolling mill may prevent the roller guide from being moved sideways to the extent that enables the extreme groove to be used.

An object involved in the present invention is to produce a roller-guide where the space required at the side by the roller holders has been reduced or eliminated. The roller-guide according to the invention is therefore characterized in that the roller holders are U-shaped with two arms which are so arranged that they enclose the auxiliary steering device between them, at least partially.

Another object of the invention is that when adjusting the positions of the roller holders it will not be necessary to manipulate the roller guide from the side where space is limited, but that this adjusting will be possible from above. One embodiment of the roller guide according to the invention designed with this end in view is characterized in that one of the arms of the roller holder is made with at least one inclined surface and that a vertically mounted screw is arranged so that its point, which is preferably conical, engages on the above-named inclined surface, thus controlling the sideways adjustment of this arm and, thereby, of the steering roller belonging to it.

Through shaping the roller holders in the manner described according to the invention, it will be possible to arrange in one and the same roller guide a plurality of auxiliary steering devices alongside each other, with the upper arms of the roller holders located above the auxiliary steering devices and the lower arms located below them. In this case, when the auxiliary steering devices thus lie as close to each other as is possible in practice, the roller holders and the steering rollers belonging to them are arranged so that one steering-rolier lies in front of and between each pair of adjacent auxiliary steering devices and one steering roller lies outside each of the two outermost auxiliary steering devices.

Figure 2:
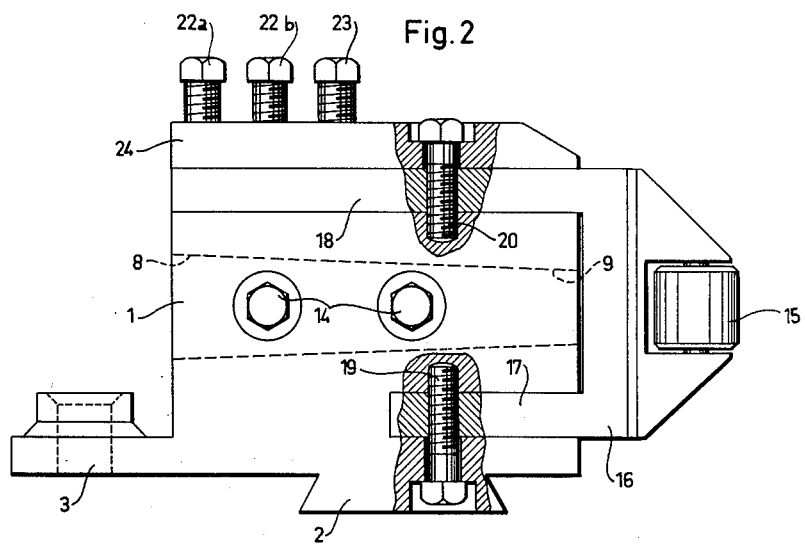

The invention will be more exactly described in what follows by reference to the accompanying drawings which show an embodiment of the roller guide according to the invention where FIG. 1 shows the roller guide seen from the side from which the rolled material is to be fed, while FIG. 2 shows a side view of the box, partly in cross section.

According to the invention the roller guide consists of a box 1 which is furnished in a way already known with means 2, 3 which secure it to the rolling-mill. In the hollow portion of the box, four auxiliary steering devices 4–7 are arranged, each one consisting of two symmetrical parts mounted vertically. Each auxiliary steering device has, in a manner already known, a relatively wide entrance 8 which narrows to form a narrowing channel whose sides 9 are in the main adapted to conform with the shape of the material to be rolled. Each auxiliary steering device has upper and lower machined surfaces 10 and 11. These surfaces form grooves between adjacent auxiliary steering devices and in these grooves there are arranged rods 12, 13 with rectangular or square cross-sections. These rods thus serve to keep the auxiliary steering devices apart and to fix the distance between them. It is thus a simple matter to vary the distance between the auxiliary steering devices, by changing the rods. If a rod with a rectangular cross-section is turned through 90° it can be used to provide two different distances between the auxiliary steering devices. The rods, and preferably also the machined surfaces 10, 11 may be tapered somewhat, so that the rods may be pushed in to the desired length between the auxiliary steering devices, thus allowing a high degree of control over the distance between the auxiliary steering devices.

The auxiliary steering devices are pushed together from the sides and held in position in the box by screws 14. Since there are two such screws arranged on each of the side walls of the box the direction of the auxiliary steering device in the box may be varied somewhat by adjusting the screws.

After the auxiliary steering devices, looking in the direction of motion of the material to be rolled, there are five steering rollers 15. Each roller is mounted on a roller holder 16 in the form of a horizontal U with a long upper arm 18 and a short lower arm 17. The arms are mounted on coaxially situated pivots 19, 20. The extended part of the upper arm 18 is furnished with an inclined surface 21, against which the conically-shaped points of screws 22a and 22b engage, said screws being fixed vertically in a plate 24 mounted above the arms 18. It is thus possible to alter sideways the position of the arms 18 by adjusting the height of the screws 22a and 22b. The arms are fixed in the desired position by means of screws 23. The upper arms of the two outside roller holders are, as is seen from FIG. 1, furnished with only one inclined surface 21 while the three inner arms are furnished with two inclined surfaces each, with a screw engaging on each surface.

Owing to the fact that all the means of adjustment are easily accessible from above it is thus a simple matter, with the arrangement shown, to regulate sideways the positions of the roller holders and steering rollers.

In the embodiment shown each of the two outside steering rollers will serve one auxiliary steering device, while the three inner steering rollers will each serve two auxiliary steering devices. This means that two strips of material to be rolled cannot be allowed to run through two adjacent auxiliary steering devices at the same time since the steering roller lying between will not then be able to rotate freely. However, two alternate auxiliary steering devices may be used simultaneously. With the embodiment shown it is thus possible to guide two strips of material to be rolled through the first and the third auxiliary steering devices. Thereafter, a changeover may be made and the two strips guided through the second and fourth auxiliary steering devices, during which time the roller grooves corresponding to the first and third auxiliary steering devices may cool down. When this has taken place the rolling may be switched back to the first and third auxiliary steering devices. Such switching reduces considerably the wear and tear on the rollers.

With the roller guide according to the invention the auxiliary steering devices can be placed so near to each other that the distance between two adjacent auxiliary steering devices is only twice that between the roller grooves. On the other hand when using conventional roller guides, where each roller guide contains only one auxiliary steering device, it is barely possible to reduce the distance to less than the width of four roller grooves. This close grouping of the auxiliary steering devices and this method of arranging a plurality of initial steering devices in one roller guide enable all roller grooves in a pair of rollers, including those grooves situated on the extreme ends of the roller, to be served with very few switches of the roller guide.

What is claimed is:

1. A roller guide for rolling mills comprising a box, means for securing said box to a rolling mill, a series of at least two auxiliary steering devices positioned side by side in said box, a plurality of U-shaped guides each having an arm positioned above and an arm positioned below said auxiliary steering devices, one roller guide being positioned between each adjacent pair of auxiliary steering devices and one roller guide being positioned laterally of each auxiliary steering device at each end of said series of auxiliary steering devices, and a roller carried by each of said guides.

2. A roller guide as defined in claim 1 in which said arms are pivotally secured to said box.

3. A roller guide as defined in claim 2 in which at least one arm of each of said roller guides is provided with an inclined surface, said roller guide comprising screws having conical end surfaces mounted on said box and positioned so that said conical end surfaces of said screws may engage said inclined surfaces of said arms.

4. A roller guide as defined in claim 3 in which said auxiliary steering devices are laterally adjustable in said box.

5. A roller guide as defined in claim 4 in which the upper arms of said roller guides are longer than the lower arms thereof.

6. A roller guide as defined in claim 5 comprising at least three auxiliary steering devices and an equal number plus one roller guides and rollers.

References Cited in the file of this patent
UNITED STATES PATENTS

| | | |
|---|---|---|
| 796,335 | Johnston | Aug. 1, 1905 |
| 2,832,248 | Steele | Apr. 29, 1958 |
| 2,976,749 | Albedyhl | Mar. 28, 1961 |